May 21, 1946.   H. W. KOST   2,400,545
SHEET METAL FASTENER
Filed Sept. 1, 1944
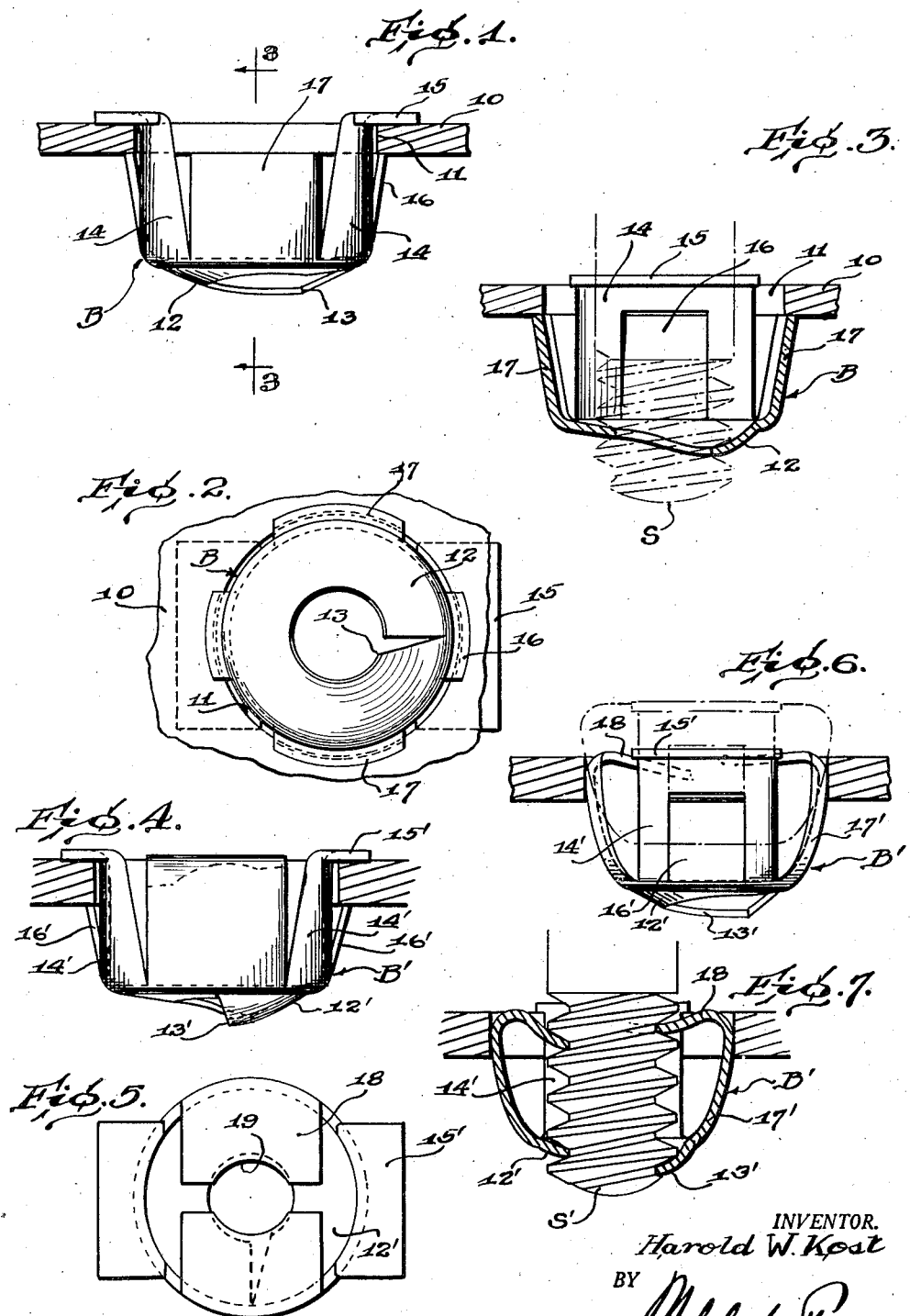
INVENTOR.
Harold W. Kost
BY
ATTORNEY Patented May 21, 1946

2,400,545

UNITED STATES PATENT OFFICE 2,400,545

SHEET METAL FASTENER

Harold W. Kost, Birmingham, Mich., assignor to Detroit Harvester Company, Detroit, Mich., a corporation of Michigan Application September 1, 1944, Serial No. 552,257

1 Claim. (Cl. 85—5)

This invention relates to fasteners but more particularly to sheet metal fasteners adapted to receive screw threaded members.

An object is to produce a fastener of the above character which can be inserted into an aperture of a supporting panel and securely held in place, the fastener having screw thread engaging means so that a screw can be applied for attaching an object to the supporting panel.

Another object is to produce a fastener which can be inserted into an aperture of a supporting panel and has a plurality of screw thread engaging devices adapted to cooperate with each other securely to retain the screw in place.

A further object is to produce a simple and efficient sheet metal fastener which can be readily secured within an aperture of a supporting member so that the major portion of the fastener is concealed from view, the arrangement being such that the fastener can be quickly snapped into position of use without the necessity of special tools and, when mounted, is adapted for the reception of a screw.

A still further object is to produce a new and improved fastener of spring metal which is adapted to be readily applied in position of use and is formed with integral screw thread engaging means and also lock nut means for militating against the screw coming loose due to jars, shocks or vibrations.

Other objects and advantages will hereinafter appear and for purposes of illustration but not of limitation, embodiments of the invention are shown in the accompanying drawing in which Figure 1 is a side elevation partly in cross section of a fastener mounted in a supporting panel;

Figure 2 is a bottom plan view of the fastener;

Figure 3 is a vertical section on the line 3—3 of Figure 1;

Figure 4 is a side elevation partly in section of another form of fastener embodying an additional screw thread engaging means;

Figure 5 is a top plan view of the fastener shown on Figure 4;

Figure 6 is a side elevation of the fastener shown on Figure 4 viewing another side and showing the screw thread engaging fingers; and Figure 7 is a vertical sectional view of the fastener shown on Figures 4 to 6 showing a screw applied thereto.

The illustrated embodiment of the invention shown on Figures 1 to 3 comprises a supporting panel 10 provided with a fastener receiving aperture 11, which in this instance is round. The fastener comprises a one-piece cup shaped body B formed by stamping from spring sheet metal. The body B has a substantially circular bottom wall 12 which is integrally formed with a screw thread engaging portion 13. The particular contour of the thread engaging portion forms no part of the present invention and detail description thereof is not considered necessary. Suffice it to say that the same as illustrated is available on the market under the name "Prestole" and is substantially as shown and described in the patent to Harold W. Kost No. 2,169,182. Rising upwardly from the edge portions of the bottom wall 12 is a pair of diametrically opposed arms or tongues 14 which are curvilinear in cross section. Integral with the outer or upper ends of the arms 14 are outwardly bent flanges 15, which abut against the outer face of the supporting panel 10 adjacent the edge of the aperture 11.

Integral with each of the arms 14 and struck outwardly therefrom are substantially rectangular fingers 16, which are curvilinear in cross section and are connected at their lower ends to the respective arm, the fingers inclining upwardly and outwardly therefrom. The free end of each finger 16 is spaced from the adjacent flange 15 a distance approximately equal to the thickness of the supporting panel 10, thereby to impinge against the under side of the panel and cooperate with the flange 14 in holding the fastener in position.

Interposed between the tongues or arms 14 respectively is a pair of diametrically opposed tongues 17, which are likewise curvilinear, are integral with the bottom wall 12 and incline upwardly and outwardly therefrom. The upper ends of the tongues 17 terminate in a plane coinciding with the upper ends of the fingers 16, thereby similarly to impinge against the under side of the supporting panel 10 to cooperate with the flanges 15 for holding the fastener in place. Manifestly the fingers 16 and the tongues 17 provide four places of contact with the under side of the panel 10 in substantially equidistantly spaced arrangement for holding the fastener against movement outwardly of the panel.

In use, it will be apparent that the fastener is forced into the panel aperture 11, thereby flexing the tongues 17 and fingers 16 inwardly until their free ends pass through the aperture and can then snap outwardly to positions shown on Figures 1 and 3. Substantially at that time the flanges 15 will have engaged the outer surface of the panel 10, so that the cup-shaped body B is thereby firmly and securely in position to receive a screw S for connecting a member to the panel. One advantage of this structure resides in recessing the fastener so that a supporting panel need be formed with a single aperture for each fastener required. Thus the outer face of the panel is substantially smooth and uninterrupted. Manifestly when the screw S is tightened, the bottom wall 12 will be drawn toward the supporting panel 10 so that the fastener is even more securely retained in the desired position.

The form of the invention shown in Figures 4 to 7 is in general similar to that above described in that it is formed with a cup-shaped body B', which is formed with a bottom wall 12' provided with a nut-like screw thread engaging part 13'. Tongues 14' are similar to the tongues 14 above described and have flanges 15' and integral outwardly inclined fingers 16'.

As shown on Figure 7, a pair of tongues or arms 17' replace the tongues 17 above described and incline upwardly and outwardly from the bottom wall 12' so that when the fastener is mounted within the panel aperture, the upper portions of the tongues engage the wall of the aperture as shown. The outer end portion 18 of each tongue 17' is bent inwardly into the path of the screw, the free ends being spaced axially from each other in accordance with the pitch of the screw thread. As shown, each end portion 18 is formed with a curvilinear notch 19 in order effectively to contact the root diameter of the screw.

When a screw S' (Figure 7) is inserted in the fastener, it first engages the end portions 18 screw threadedly and then the nut portion 13'. Upon tightening the screw, the nut portion or Prestole 13' is deformed to grip tightly the root diameter of the screw and the end portions 18 also tighten upon the screw, effecting a toggle-like action forcing the tongues 17' into intimate binding contact with the wall of the panel aperture. Thus the screw S' is engaged at two regions and a lock nut effect secured, thereby militating against the screw or fastener S' coming loose.

It is to be understood that numerous changes in details of construction, arrangement and operation may be effected without departing from the spirit of the invention especially as defined in the appended claim.

What I claim is:

A fastener comprising a cup-shaped sheet metal body, screw thread engaging means deformed from the body at the inner end thereof, said body having two pairs of tongues, outwardly extending flanges on an opposed pair of said tongues, outwardly inclined integral fingers struck from said last tongues, respectively, the free ends of said fingers being spaced from said flanges a distance substantially equal to the thickness of the supporting panel on which it is intended to mount the fastener, and the other pair of tongues having their free ends terminating substantially in alignment with the free ends of said fingers for similar panel engagement.

HAROLD W. KOST.